(12) United States Patent
Koerner et al.

(10) Patent No.: US 10,710,469 B2
(45) Date of Patent: Jul. 14, 2020

(54) AUTOMOTIVE DUAL VOLTAGE BATTERY CHARGING SYSTEM

(71) Applicant: HELLA GmbH & Co. KGaA, Lippstadt (DE)

(72) Inventors: André Koerner, Lippstadt (DE); Sebastian Kahnt, Karlstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 185 days.

(21) Appl. No.: 15/972,886

(22) Filed: May 7, 2018

(65) Prior Publication Data

US 2018/0254658 A1 Sep. 6, 2018

Related U.S. Application Data

(63) Continuation of application No. PCT/EP2016/076092, filed on Oct. 28, 2016.

(30) Foreign Application Priority Data

Nov. 6, 2015 (EP) .................................... 15193425

(51) Int. Cl.
*B60L 58/19* (2019.01)
*H02J 7/34* (2006.01)
(Continued)

(52) U.S. Cl.
CPC ............ *B60L 58/19* (2019.02); *H02J 7/0016* (2013.01); *H02J 7/0024* (2013.01);
(Continued)

(58) Field of Classification Search
CPC ............................... B60L 58/19; H02J 7/0024
See application file for complete search history.

(56) References Cited

U.S. PATENT DOCUMENTS 4,992,672 A 2/1991 Norton
5,960,898 A * 10/1999 Okada .................. H02J 7/0024
180/65.8

(Continued)

FOREIGN PATENT DOCUMENTS

DE 102012010711 A1 3/2013
DE 102013113182 A1 5/2015

OTHER PUBLICATIONS

International Search Report and Written Opinion of the International Searching Authority dated Jan. 25, 2017 of application PCT/EP2016/076092 on which this application is based.

*Primary Examiner* — Rexford N Barnie
*Assistant Examiner* — David A Shiao
(74) *Attorney, Agent, or Firm* — Muncy, Geissler, Olds & Lowe, P.C.

(57) ABSTRACT

A dual voltage power supply having at least one battery with multiple battery modules and a first set of switches for connecting the battery modules in series to thereby provide a first voltage to a first circuit in case the first switches are closed and to disconnect the series connection case the first switches are open. At least one connection tap is connected to one of the battery modules to provide its voltage to a second circuit operating at a lower voltage than the first circuit and being connected in parallel by a second set of switches to other battery modules. The other battery modules are connected in parallel to each other and one of the battery modules, in case the second set of switches is closed and are not connected in parallel in case the second set of switches is open, can be charged with off the shelf generators.

16 Claims, 5 Drawing Sheets

(51) Int. Cl.
*H02J 7/00* (2006.01)
*H02J 7/14* (2006.01)
*H02J 7/16* (2006.01)

(52) U.S. Cl.
CPC ............ *H02J 7/1423* (2013.01); *H02J 7/345*
(2013.01); *H02J 7/16* (2013.01)

(56) References Cited

U.S. PATENT DOCUMENTS

| | | | |
|---|---|---|---|
| 7,180,205 B2 * | 2/2007 | Wirdel | B60L 3/003 |
| | | | 307/10.1 |
| 2004/0130214 A1 | 7/2004 | Murty et al. | |
| 2005/0151517 A1 * | 7/2005 | Cook | B60R 16/03 |
| | | | 323/207 |
| 2007/0159007 A1 * | 7/2007 | King | H02J 7/0024 |
| | | | 307/71 |
| 2011/0098887 A1 | 4/2011 | Fujimoto | |
| 2012/0187887 A1 * | 7/2012 | Sone | H02M 1/10 |
| | | | 318/504 |
| 2014/0183939 A1 * | 7/2014 | Jiang | B60L 7/10 |
| | | | 307/9.1 |
| 2014/0265559 A1 | 9/2014 | Leehey et al. | |
| 2014/0285003 A1 * | 9/2014 | Mueller | B60L 7/10 |
| | | | 307/10.1 |
| 2014/0368041 A1 * | 12/2014 | Tu | B60L 58/40 |
| | | | 307/52 |
| 2015/0303838 A1 * | 10/2015 | Takahashi | H02P 27/06 |
| | | | 318/400.3 |
| 2016/0031341 A1 * | 2/2016 | Komatsu | B60L 15/007 |
| | | | 307/10.1 |
| 2016/0339858 A1 * | 11/2016 | Fink | B60R 16/033 |
| 2017/0217313 A1 * | 8/2017 | Hashimoto | B60L 3/003 |
| 2018/0043789 A1 * | 2/2018 | Goetz | H02J 7/1423 |

* cited by examiner

AUTOMOTIVE DUAL VOLTAGE BATTERY CHARGING SYSTEM

This nonprovisional application is a continuation of International Application No. PCT/EP2016/076092, which was filed on Oct. 28, 2016, and which claims priority to European Patent Application No. EP 15193425.4, which was filed in the European Patent Office on Nov. 6, 2015, and which are both herein incorporated by reference.

BACKGROUND OF THE INVENTION

Field of the Invention

The present invention relates to charging a dual voltage power supply for vehicles, e.g. light trucks, trucks, cars and the like. The dual voltage power supply comprises at least a battery with multiple battery modules. The battery may further comprise a first set of switches for connecting the battery modules in series and second set of switches for connecting the battery modules in parallel. In case the series connection is established, a first voltage $U_1$ is provided via a first connection tap to a first circuit. A second voltage $U_2$ is provided via a second connection tap to a second circuit. In case parallel connection is established all or some battery modules may be connected via the second connection tap to the second circuit. The invention further relates to a method for operating such dual voltage power supply and for charging the battery.

Description of the Background Art

US 2004/0130214 A1 suggest a two voltage system for automotive applications. The two voltage system has a 42 V circuit including a battery, an alternator for charging the battery and high power loads like e.g. a starter. The battery has multiple battery cells being connected in series to obtain said 42 V. The battery provides as well a low voltage tap for feeding a low voltage circuit with 14 V. The low voltage tap is simply a connection to an intermediate voltage level of the series connection of the battery cells. The two voltage circuits are coupled by a bi-directional DC/DC converter. In case the load drawn from the low voltage circuit is low, it is fed by the DC/DC converter. In case the current demand of the low voltage circuit is higher, the voltage provided by the low voltage output of the DC/DC converter drops and the additional required energy is provided by the low voltage tap. Asymmetric discharging of the battery cells is compensated by a charge equalizer.

US 2014/0265559 A1 as well relates to a two voltage system for automotive applications. A first voltage system supplies the input side of a DC/DC converter which in turn supplies the second voltage system with a higher voltage. The second voltage system includes an energy storage. If the power demand of the input side of the DC/DC converter exceeds a threshold, the energy storage provides the additional power.

U.S. Pat. No. 4,992,672 discloses a dual voltage power supply comprising an alternator driven at variable speed by a vehicle engine. The alternator directly feeds a load like a windshield heater or the like at a first voltage level and is controlled by a first- or second-voltage regulator (wherein the first voltage level is above the second voltage level), the latter controlling the alternator field current. The alternator output is supplied via a second voltage regulator to charge a battery and to supply power to the second voltage circuit. In case high power and thus the first voltage devices are switched off, the alternator output is regulated to maintain charging of the battery by an alternator field control circuit.

DE 10 2013 113 182 A1 discloses a two voltage battery for feeding a 12 V and a 48 V circuit. The battery has multiple battery cells being connected in series by a first set of switches and being connected in parallel by a second set of switches. In case the first set of switches is closed, the second set of switches is open and the battery is connected to the 48 V circuit. The 48 V circuit includes a generator for charging the battery. The generator is as well used as motor for assisting a combustion engine. Alternatively, the second set of switches is closed, the first set is open and the battery is connected to the 12 V circuit. In case the combustion engine requires assistance or in generator assisted braking, commonly referred to as 'recuperation', the battery and the generator are switched to their 48 V modes to keep currents low. If further 48 V devices have to be supplied with energy an additional 48 V battery is suggested. Alternatively, multiple two voltage batteries may be connected in parallel. The latter has the advantage that the 12 V circuit and the 48 V circuit can be used in parallel and that the load can be distributed across the batteries.

DE 10 2012 010 711 A1 as well relates to a two voltage battery system for feeding a 12 V and a 48 V system. Like in DE 10 2013 113 182 A1 battery cells are connected in series to provide 48 V and connected in parallel to provide 12 V.

The problem to be solved by the invention is based on the observation that high voltage devices in cars cannot be simply switched off in case they are not needed as these devices often have to be activated quickly and thus cannot be switched off completely as suggested in U.S. Pat. No. 4,992,672. The teaching of DE 10 2013 113 182 A1 has huge advantages in in mild hybrid systems, but for non-hybrid vehicles a separate starter and an alternator in 12 V technology are much cheaper than 48 V technology. Reverting completely to a 12 V system, however poses substantial problems with high power loads, like e.g. an electric power steering system (EPS). In addition, such systems cannot be simply switched off when driving as they are mostly controlled by complex controllers. Beyond, charging the 48 V circuit requires corresponding voltages to be provided by the generator. However, if the combustion engine is operated at low engine rpm, the voltage provided by of the shelf generators is below said 48 V and the battery cannot be charged. This is for example relevant when driving at moderate speeds in a high gear, and in particular when slowing down, where recuperation shall take place. But of course it is advantageous to charge the battery, at low or moderate engine power.

SUMMARY OF THE INVENTION

It is therefore an object of the present invention to provide a dual voltage power supply that makes use of the observation, that most of the high power loads require comparatively high currents only for short amount of times, but repetitively.

In an exemplary embodiment, the dual voltage power supply, comprises at least a battery with multiple battery modules. The battery modules can each comprise a number of battery cells. The rated voltage of the battery modules should be the same, e.g. 12 V nominal voltage like a typical automotive battery. Preferably, the battery includes at least one battery management module, e.g. each battery module may comprise a battery management module for efficiently charging the respective battery module. The charging management module(s) may communicate, e.g. via a bus system, with the controller and/or with each other.

The battery may further comprise a first set of switches for connecting the battery modules in series. In other words the battery modules are connected in series wherein a switch of said first set of switches is positioned between each two electrically neighbored battery modules to either connect said modules in case the switch is closed or to disconnect them in case the switch is open. In addition the battery may comprise a second set of switches connecting at least two of said battery modules in parallel when the second set of switches is closed. Preferably, all battery modules which are connected by said first set of switches are as well connected by said second set of switches.

When closing the first set of switches, a first voltage is supplied via a first connection tap to a first circuit. Opening said first set of switches disconnects the battery modules from each other. Said first circuit may comprise loads requiring comparatively high amounts of electrical power, like for example an EPS or a an auxiliary engine. Such applications require peak power supply of up to 15 kW. However, such high power is not required continuously but only upon demand and for short amounts of time. In the meantime, during the so called idle state, the required power is in the range of a few Watt, e.g. 1 to 10 W, in some cases up to 500 W. During these 'low power times', a simple and thus cheap first DC/DC converter may provide the required power to the first connection tap and thus the first circuit, however, if the required power raises and cannot be provided by the first DC/DC converter, the first set of switches may be closed and the battery modules may thereby be connected in series to energize the first circuit.

When opening the first set of switches and closing the second set of switches, the respective battery modules are connected in parallel to the second circuit via a second connection tap and can be charged in parallel for example by a generator driven by a combustion engine. Alternatively, comparatively high currents can be drawn from the battery at the second voltage level, e.g. for cranking, i.e. starting a combustion engine.

For example, the second connection tap and thus the second circuit may remain connected to one of the battery modules even in case the second set of switches is open. This preferred connection may be hard wired, i.e. permanently, or controlled by a controller operating at least one switch in between the connection tap and said one of the battery modules. This enables to provide power to the second circuit, i.e. to supply the second circuit, independently from the setting of the sets of switches. Beyond, this enables to continuously supply the second circuit or to charge said battery module independently of the states of the sets of switches. Additionally, at least this one of the battery modules may be charged even if the voltage provided by the generator is below the first voltage $U_1$, e.g. because the combustion engine runs at a corresponding low rpm. Only to avoid ambiguities, providing a connection between one of the battery modules and the second circuit is optional, but preferred. In particular the controller may communicate via a communication bus with battery management modules of the batteries and select a battery module based on information being provided by the battery management modules for being connected to the second connection tap, while the batteries are connected in series. For example the controller may select the battery module having the highest available capacity and/or charge state for being connected to the second connection tap.

The first and second circuits can share a common ground and are thus not galvanically isolated. This reduces the complexity of the circuit. For example a single connection tap is sufficient to connect the battery permanently to the second circuit (provided that the first and second circuit share a common ground).

Only to avoid ambiguities closing or opening a set of switches means closing or opening, respectively, all switches of said set of switches. The switches are typically semiconductor switches, e.g. IGBTs or MOSFETS. Of course contactors or other types could be used as well. The switches are preferably controlled by a controller, i.e. a controller is connected to the control input of the respective switch to change its state by controlling the voltage at the control input. In practice the controller may control gate voltages of said semiconductor switches.

For example, the dual voltage power supply further comprises at least one first DC/DC converter. The input of said first DC/DC converter is supplied by the second circuit (preferably only) and the output of said first DC/DC converter supplies the first circuit. At least one storage capacitor may be connected in parallel to the output of the first DC/DC converter. The first DC/DC converter enables to supply the first circuit permanently, i.e. even if the first set of switches is open, in case the power being drawn by the load(s) of the first circuit is lower than a power threshold, which is preferably lower than the rated power of the first DC/DC converter. This is typically the case if the load(s) are in an idle state. For example an EPS draws only little power when driving along a straight street. In other words the power provided by the first DC/DC converter is sufficient to maintain the loads of the first circuit in an idle state. However, in case the first DC/DC converter is unable to provide the required power, e.g. because an EPS requires a higher current, the first set of switches are closed and the current is provided by the battery. A controller may thus monitor the required power and closes the first set of switches in case the power demand is higher than the power threshold, e.g. the power that can be provided by the first DC/DC converter. Short peaks and/or small peaks of the power demand that are above the nominal power of the first DC/DC converter can be compensated by the storage capacitor without closing the first set of switches and thus without interrupting charging of the battery modules in case the voltage provided by the generator is below the first voltage U1. After the peak, the storage capacitor can be reloaded by the first DC/DC converter. Preferably the capacity C of the storage capacitor is bigger or equal 1 s·$I_{max}$/$U_1$, wherein $I_{max}$ is the maximum rated current of the first DC/DC converter, even more preferred the capacity C is bigger equal 2 s·$I_{max}$/$U_1$ or even bigger or equal 5 s·$I_{max}$/$U_1$. This means that the first DC/DC converter requires 1, 2, or 5 seconds, respectively, to charge a completely discharged storage capacitor.

Thus, connecting the battery modules in series is required only in case the power demand exceeds the rated power of the DC/DC controller over an amount of time being defined by the capacitor. Thus it is essentially sufficient to monitor the voltage of the capacitor. In addition other entities being representative for the charge state of the capacitor may be monitored as well. A further option is to monitor the temperature the DC/DC converter and to connect the battery modules in series, if the temperature of the DC/DC converter (and/or the change in temperature, i.e. the first derivative and/or second derivative) exceeds a threshold.

As apparent from the above, the nominal power of the first DC/DC converter is significantly smaller than the nominal power of the battery. For example the nominal power of the first DC/DC converter is smaller or equal to 10% of the nominal power of the battery. Preferable the nominal power of the first DC/DC converter is smaller or equal to 5% or even smaller or equal to 1% of the nominal power of the battery. In any case the, the first DC/DC converter is preferably dimensioned with respect to the loads of the first circuit.

To monitor the required power, said controller can for example measure the input and/or output current of the first DC/DC converter and close the first set of switches in case the at least one of said currents exceeds a respective threshold. The current can be measured, e.g. as voltage across a shunt. Alternatively (or additionally), the voltage of the first circuit can be monitored by the controller. In case said voltage of the first circuit drops below a threshold, the first set of switches is closed. In case said voltage raises again, this may indicate that the load is reduced and the first set of switches can be opened again. Preferably, the second set of switches or at least some of them are closed in turn, e.g. for charging the battery modules thereby being connected in parallel to the second circuit. Summarizing, the dual voltage power supply may preferably comprise a controller configured for monitoring the voltage at the capacitor and for closing the first set of switches and opening the second set of switches in case the voltage at the capacitor drops below a predefined value and vice versa.

For example, the first DC/DC converter can be switched off and/or disconnected from the first circuit in case the first set of switches is closed. This may be performed by the controller, controlling the first and second set of switches. The efficiency of the system is enhanced and a potential overload of the first DC/DC converter is avoided in case the battery voltage drops.

Alternatively or additionally, a load of the first circuit (e.g. said EPS) may signal its raising power demand, e.g. via a communication line or a communication bus, to the controller, which in turn closes the first set of switches in case the signaled power demand exceeds a threshold. Thereby, closing the first set of switches is accelerated or can take place even in advance, if the raising power demand is signaled in advance.

The dual voltage power supply may further comprise at least one changeover switch connecting a generator either with the second circuit or with the first circuit. The controller may determine the voltage supplied by the generator and in case the voltage supplied by the generator is above a predetermined voltage, the controller closes the first set of switches, opens the second set of switches and connects the generator to the first circuit by corresponding activation of said changeover switch. However, in case the voltage supplied by the generator is below a predetermined voltage the controller connects the generator to the second circuit by corresponding activation of said changeover switch. This enables to efficiently load the battery modules and in particular to feed loads of the first circuit, which typically have an enhanced power demand directly by the generator. The lifetime of the battery modules is enhanced accordingly.

The controller may also use the current supplied by the generator as input signal and control at least said changeover switch in response to the current supplied by the generator.

The generator voltage (and thus as well the current) depends on the rpm of the combustion engine driving said generator. If the engine's rpm exceeds an rpm threshold, the generator may be connected by corresponding activation of the changeover switch to the first circuit and the battery modules may be connected in series by said first set of switches to thereby charge them and the capacitor. A controller may thus monitor the combustion engine's rpm and/or the generator's rpm. The controller may compare at least one of said rpms with a corresponding rpm threshold and activate the changeover switch to connect the generator to the first circuit and close the first set of switches in case the monitored rpm exceeds its corresponding rpm threshold.

For example, the changeover switch can connect a generator either with one of the battery modules being connected to the second circuit or with the first circuit depending on the power demand of the first circuit, i.e. the power consumption of the first circuit. In case the power consumption of the first circuit is above a power consumption threshold, the controller activates the changeover switch to connect the generator with the first circuit. As the voltage of the generator adapts to the voltage of the respective circuit, the power that can be provided by the generator is significantly enhanced by connecting it to the first circuit, as the limiting factor is the maximum current.

Without the changeover switch, the generator may be connected to the first circuit only e.g. to the connection tab for supplying a voltage to the second circuit and for charging at least said one of the battery modules. In case the second set of switches is closed, the battery modules are charged in parallel.

Either the first or the second set of switches may be closed as it is implicit that both sets of switches may not be closed at the same time. In other words, the second set of switches is always open in case the first set of switches is closed and the first set of switches is always open in case the second set of switches is closes. It is possible to open both set of switches at the same time. In the latter case, the one battery module supplies the second circuit and via the first DC/DC converter the first circuit.

The dual voltage power supply may be part a of triple voltage system having a third voltage level in addition to the two voltage levels of the dual voltage power supply. The triple voltage system may be installed in a vehicle with an electric motor for driving the vehicle. The electric motor may replace the combustion engine or it may be a part of a hybrid vehicle with an electric motor and a combustion engine either in parallel or in series configuration. These systems often have a third voltage level being significantly higher than the first and second voltages named above, typical voltages of the third voltage level range up to 400-600 V (DC). This third voltage level is provided by a battery with a higher capacity than the battery of the dual voltage supply, as the main energy consumption of typical vehicles is required for driving the vehicle (there are only few exceptions). The circuit operating at the third voltage level (briefly 'third circuit') is preferably coupled to the dual voltage power supply via at least one second DC/DC converter. The input side of the second DC/DC converter is powered by the third circuit. The output side of the second DC/DC converter may be connected to the connection tab of the first circuit. Even more preferred, the output side of the second DC/DC converter may be connected via at least one switch to the first or the second circuit. For example a controller may operate the at least one switch and preferably as well the nominal output voltage of the second DC/DC converter. Alternatively, the second DC/DC converter may include a circuit for determining the required output voltage and adapt it accordingly.

The dual voltage power supply may thus provide the first and second circuits with energy as explained above. In addition the battery of the dual voltage power supply can be charged using energy provided by the third circuit. At low power demands, the energy to be provided to the first and second circuit can be provided by the first and second DC/DC converters. A further possibility is to connect the output side of the second DC/DC converter to the connection tap of the first circuit. This first circuit supplies the input side of a third DC/DC converter. The output side of the third DC/DC converter may be connected e.g. via a connection tap with the second circuit to thereby feed the second circuit. At least one of the first DC/DC converter and the storage capacitor may in turn be omitted. The second DC/DC converter can also be operated in reverse direction, meaning the input connection may be used as output and the output as input, like e.g. in fault situations of the storage of the third circuit in order to supply power from the dual voltage power supply to the third circuit.

DC/DC converters are known in the art and include boost converter, fly-back converters, forward converters, push-pull converters, voltage multipliers and the like, to name only a few. Briefly a DC/DC converter transforms a first DC voltage into another DC voltage.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
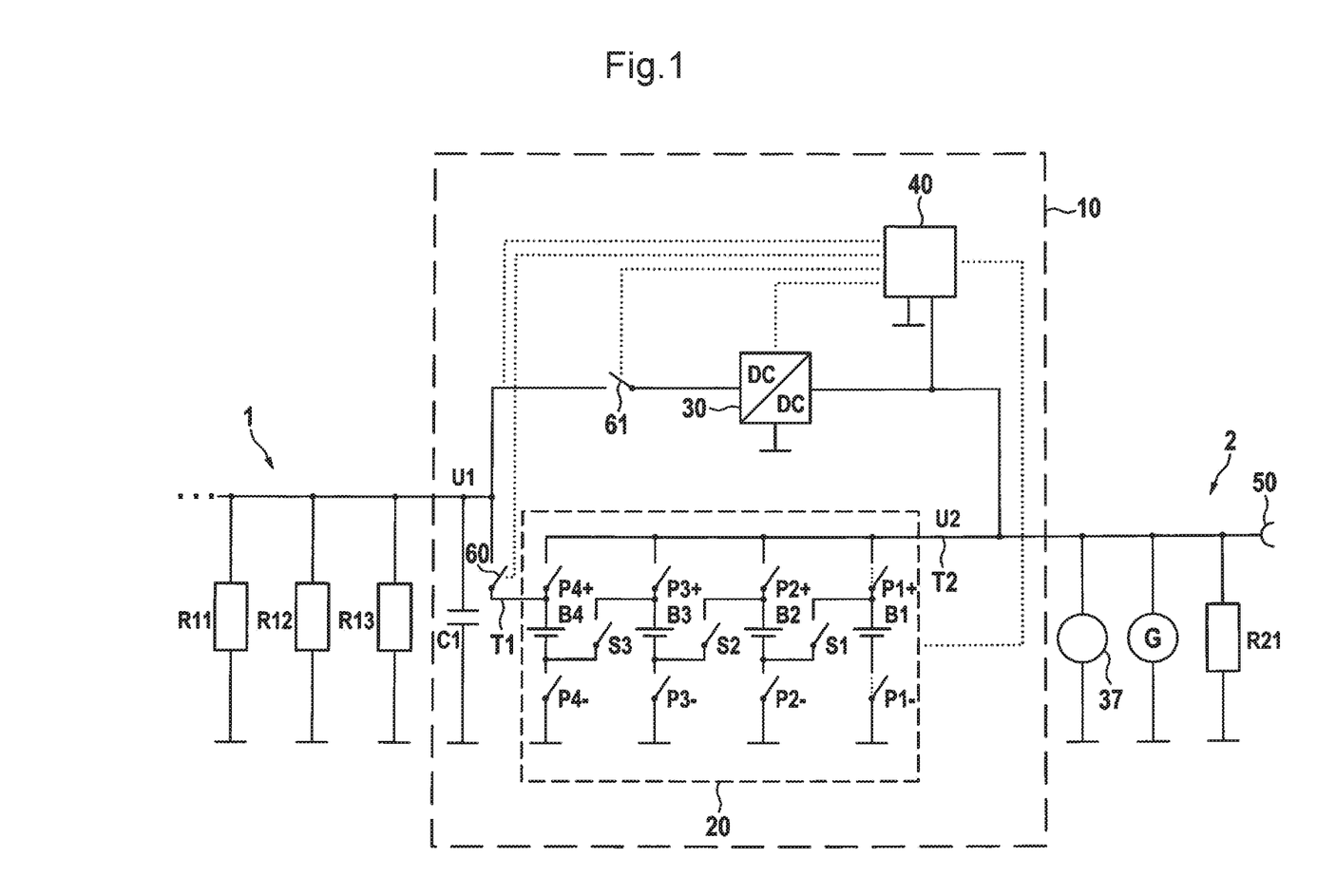
FIG. 1 shows a first example of the invention.

In FIG. 1 shows a preferred embodiment of a dual voltage power system. The dual voltage power system has a first circuit 1 with at least one load. The load is optional. Only as example three loads $R_{11}, R_{12}, R_{13}$ are shown. The first circuit 1 operates at a first voltage level $U_1$ and is connected to a dual voltage power supply 10 for being powered by said dual voltage power supply 10. The loads represented by $R_{11}$ may be auxiliary devices like e.g. an EPS or an auxiliary drive. Such devices require a comparatively high amount of power of up to 15 kW as explained above and a low amount of power in an idle state.

The dual voltage power system has a second circuit 2 with at least one load $R_{21}$. The second circuit 2 operates at a second voltage level $U_2$. The second circuit 2 is connected and thus supplied by the dual voltage power supply 10. $U_2$ is smaller than $U_1$. In automotive applications the second voltage level $U_2$ is typically 12 V. 24 V is common for trucks, agricultural machines and the like. The first voltage $U_1$ is higher than the second voltage $U_2$, e.g. 48 V, 60 V or the like. Mostly, it is an integer multiple of the second voltage $U_2$. In this example, the first and second circuits $U_1$, $U_2$ share a common ground.

The dual power voltage supply comprises a battery 20 with at least two battery modules $B_i$ ($i_{max} \leq i \leq 1$; $2 \leq i_{max}$). As example, four battery modules $B_1$ to $B_4$ are shown. Each battery module $B_i$ comprises at least one battery cell; typically the battery modules $B_i$ may each comprise multiple battery cells connected in series, to provide the second voltage level $U_2$ by each of the battery modules $B_i$.

A first set of switches $S_j$ connects the battery modules $B_i$ in series to thereby provide said first voltage $U_1$ to the first circuit, in case the all switches $S_j$ ($j_{max} \leq j \leq 1$, $j_{max} = i_{max} - 1$) are closed. In other words, the positive pole of the first battery module $B_1$ is connected by a first switch $S_1$ of said set of first switches to the negative pole of the second battery module $B_2$. The positive pole of the second battery module $B_2$ is connected by a second switch $S_2$ to the negative pole of the third battery module $B_3$ and so forth. The minus pole of the first battery module $B_1$ and the plus pole of the last battery module of the series of battery modules are connected to the first circuit. An optional switch 60 enables to cut the battery 20 from the first circuit 1. In case all switches $S_j$ of the first set of switches are open the battery modules $B_i$ are not connected in series.

A second set of switches $P_{i+}$, $P_{i-}$ enables to connect the battery modules $B_i$ in parallel. In other words, all positive poles are connected by switches $P_{i+}$ to the positive circuit of the second circuit 2 and all negative poles are connected by switches $P_{i-}$ to the negative circuit of the second circuit. The switches $P_{1+}$ and $P_{1-}$ may be omitted as indicated by dotted lines.

The switches Sj and $P_{i+}$, $P_{i-}$ can be closed only alternatively. Only $P_{1+}$ and $P_{1-}$, which are strictly speaking not part of the second set of switches can always be kept close. Their main purpose is to cut the battery module $B_1$ if required, e.g. in case of a defect, to enable an emergency mode, etc. Not all switches $P_{i+}$, $P_{i-}$ must be closed when closing the second set of switches, for example it might be effective to balance aging of the battery modules by use of the first set of switches. Preferably, each battery module comprises a charging management module for efficiently charging the battery module. The charging management module may communicate, e.g. via a bus system with the controller.

The input side of a first DC/DC converter 30 is supplied by the second circuit 2 and its output powers the first circuit 1, i.e. its input side is connected to the second circuit 2 and its output is connected to the first circuit 1. In this example, a switch 61 enables to cut the first DC/DC converter 30 from the first circuit 1. Additionally or as alternative, the first DC/DC converter 30 may be disabled by the controller as indicated by the dotted line and/or disconnected from the second connection tab $T_2$ by a further switch that has been omitted for clarity.

A capacitor $C_1$ stabilizes the first voltage U1, for example in case the first set of switches is open and the power demand raises, the capacitor $C_1$ may supply the first circuit until the first set of switches $S_j$ is closed. Preferably, the capacity of the capacitor $C_1$ is selected as explained above to enable energizing the first circuit for a longer period than required for switching and for buffering short peaks in power demand.

The second circuit 2 may comprise typical automotive auxiliary loads, like e.g. a starter motor 37 for cranking the engine, lights, engine control unit, communication and navigation devices and the like. As depicted a generator G for loading the battery may as well be connected to the second circuit 2. Such devices are available for lower costs with a rated voltage of 12 V or 24 V than for higher voltages like 48 V or 60 V. Beyond, these 12 V or 24 V devices have been optimized and approved over decades. It is thus advantageous not to replace 12 V or 24 V technique where not required. A connection terminal 50 may be used to connect further devices or an auxiliary power source to the second circuit 2, e.g. for charging the battery 20 and/or for energizing the starter motor 37 in case the battery 20 fails to provide sufficient power.

The dual voltage power supply may comprise a controller 40. The controller 40 may be connected to the switches and/or the first DC/DC converter 30 as indicated by dotted lines to control said devices, i.e. to close or open the switches, to monitor the input and/or output voltage(s) of the first DC/DC converter 30, its load status, to switch it on or off, etc. The controller preferably monitors the first and/or second voltages $U_1$, $U_2$ and the currents provided by the dual voltage power supply to the first and/or second circuits 1, 2.

Figure 2:
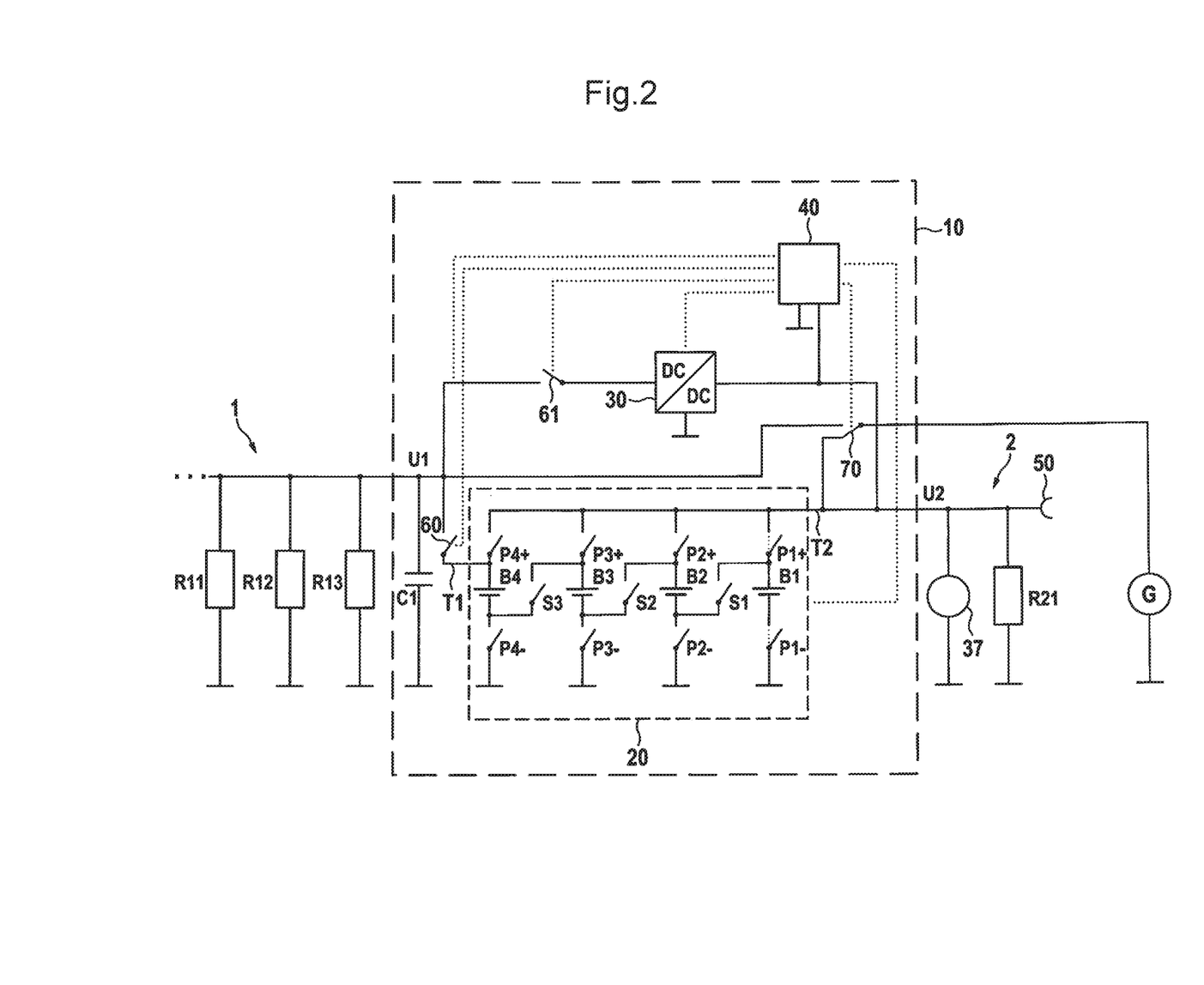
FIG. 2 shows a second example of the invention.

FIG. 2 shows a similar alternative embodiment. The same reference numerals are for the same or similar details. The description of FIG. 2 can be read as well on FIG. 2, the only difference is that the generator G is connected to a changeover switch 70. Said changeover switch 70 may be controlled by the controller 40 (or a separate controller). The changeover switch 70 enables to connect the generator either to the first or to the second circuit 1, 2, depending on the voltage provided by said generator G and the first and second set of switches. Only in case the first set of switches Sj is closed and the voltage provided by the generator G is above the voltage level U1, the controller connects the generator G to the first circuit 1 by corresponding activation of the changeover switch. In all other operating states the changeover switch 70 may preferably connect the generator G to the second connection tab 2. The controller may monitor the generator voltage and/or current directly and/or the combustion engines rpm and activate the changeover switch 70 depending on at least one of said values.

Figure 3:
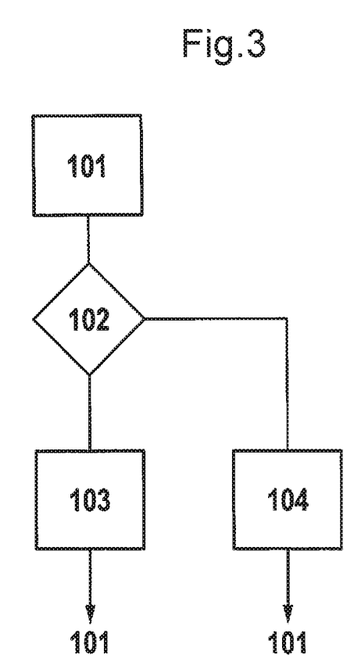
FIG. 3 shows a flow diagram of a method according to the invention.

FIG. 3 is a flow diagram illustrating a method for operating a dual voltage power supply, e.g. of this shown in FIGS. 1 and 2. In a first step 101 the power demand of the first circuit 1 is determined. The power demand is compared to a power threshold (step 102)

In case the power demand is above the power threshold, the method continues to step 103. Step 103 comprises at least connecting the battery modules $B_1$ in series and connecting said series of battery modules $B_1$ to the first circuit 1. This can be referred to as establishing a series connection of the battery modules Step 103 may further comprise disconnecting the first DC/DC converter 30 from the first and/or second circuit (1, 2). Beyond, a generator voltage may be provided to said first circuit 1 in case the generator voltage is above a threshold, which may be e.g. the first voltage $U_1$.

In case the power demand is below the power threshold, the method continues to step 104. Step 104 comprises at least disconnecting the series of battery modules ($B_i$) from the first circuit 1 and connecting the first DC/DC converter's 30 input with the second circuit 2 and its output with the first circuit 1. Further, Step 104 may comprise connecting at least two of the battery modules $B_1$ in parallel. A generator may be connected to the second circuit 2.

Figure 4:
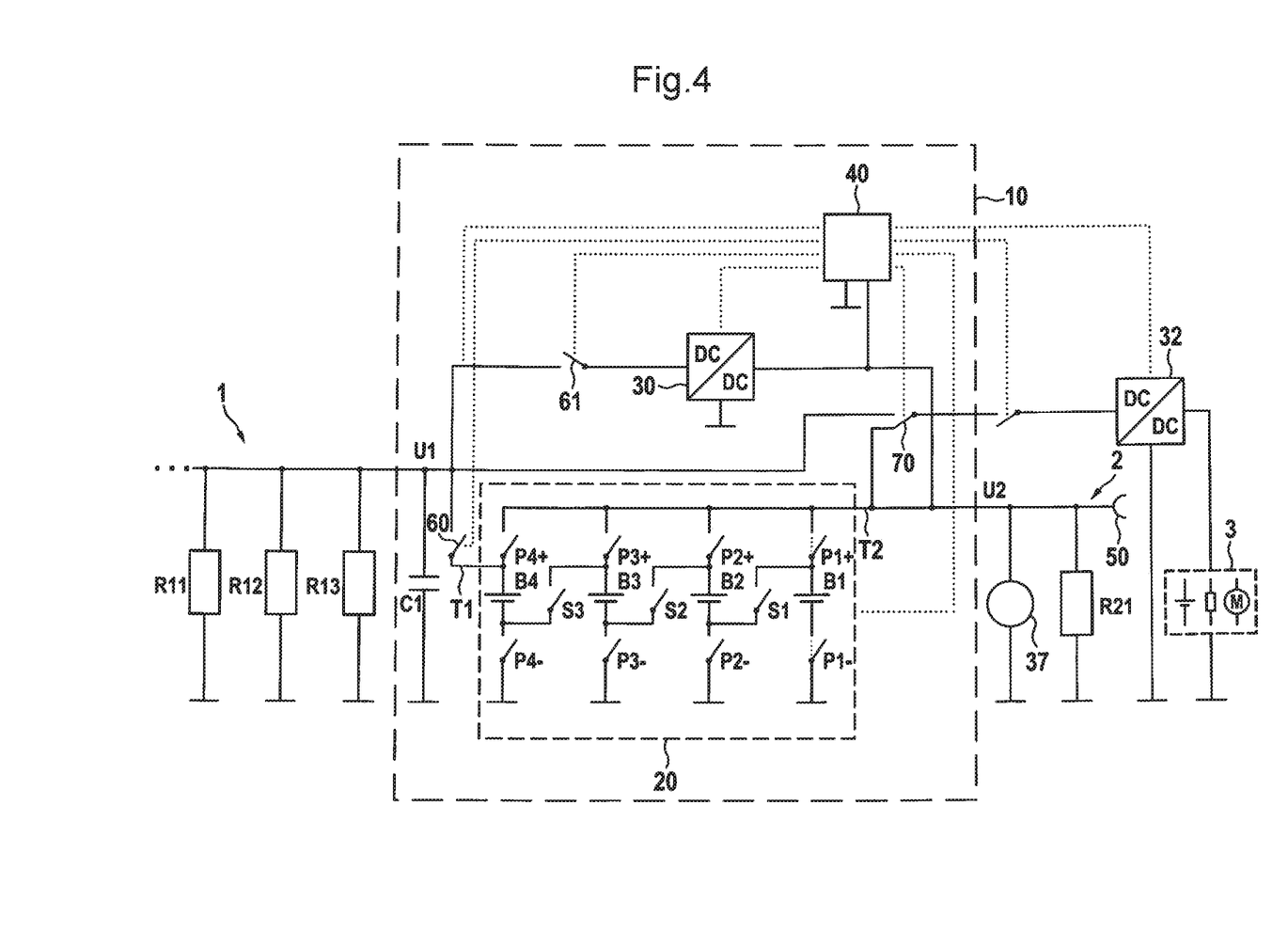
FIG. 4 shows a third example of the invention.

The example as shown in FIG. 4 is similar to the example of FIG. 2 and the same reference numerals are used where appropriate. The example distinguishes over the example in FIG. 2 in that it comprises a third circuit 3. This third circuit 3 can be a high voltage circuit as required in electric cars and hybrid cars. The typical voltage of such a circuit is significantly above the voltage $U_1$ of the first circuit 1. For example the voltage of the third circuit can be in the range of 400 V to 600 V. This third circuit may thus comprise at least one electric motor for driving a vehicle and an accordingly dimensioned battery. The battery of the third circuit 3 thus has a significantly bigger capacity than the battery 20 and the energy that can be recuperated by the motor (if used as generator) of the third circuit 3 can as well be higher as the energy provided by typical off the shelf generator being coupled to a combustion engine in non-hybrid vehicles. These hybrid or purely electric vehicles, however require as well a battery 20 for supplying components operating at lower voltages $U_1$, $U_2$. To enable efficient charging of the battery 20, the third circuit 3 may supply a second DC/DC converter 32. The second DC/DC converter 32 in turn supplies the first circuit 1 or the second circuit 2, depending on the position of switch 70, which is controlled by the controller 40. The output voltage of the second DC/DC converter 32 may be controlled by the controller 40. Alternatively, the second DC/DC converter may have an output voltage detection circuit. The controller 40 may optionally disconnect the second DC/DC converter 32 from the switch 70 as indicated by a switch (without ref. numeral) connecting the second DC/DC converter and the switch 70. Beyond, the description of FIG. 2 can be read on FIG. 4 as well.

Figure 5:
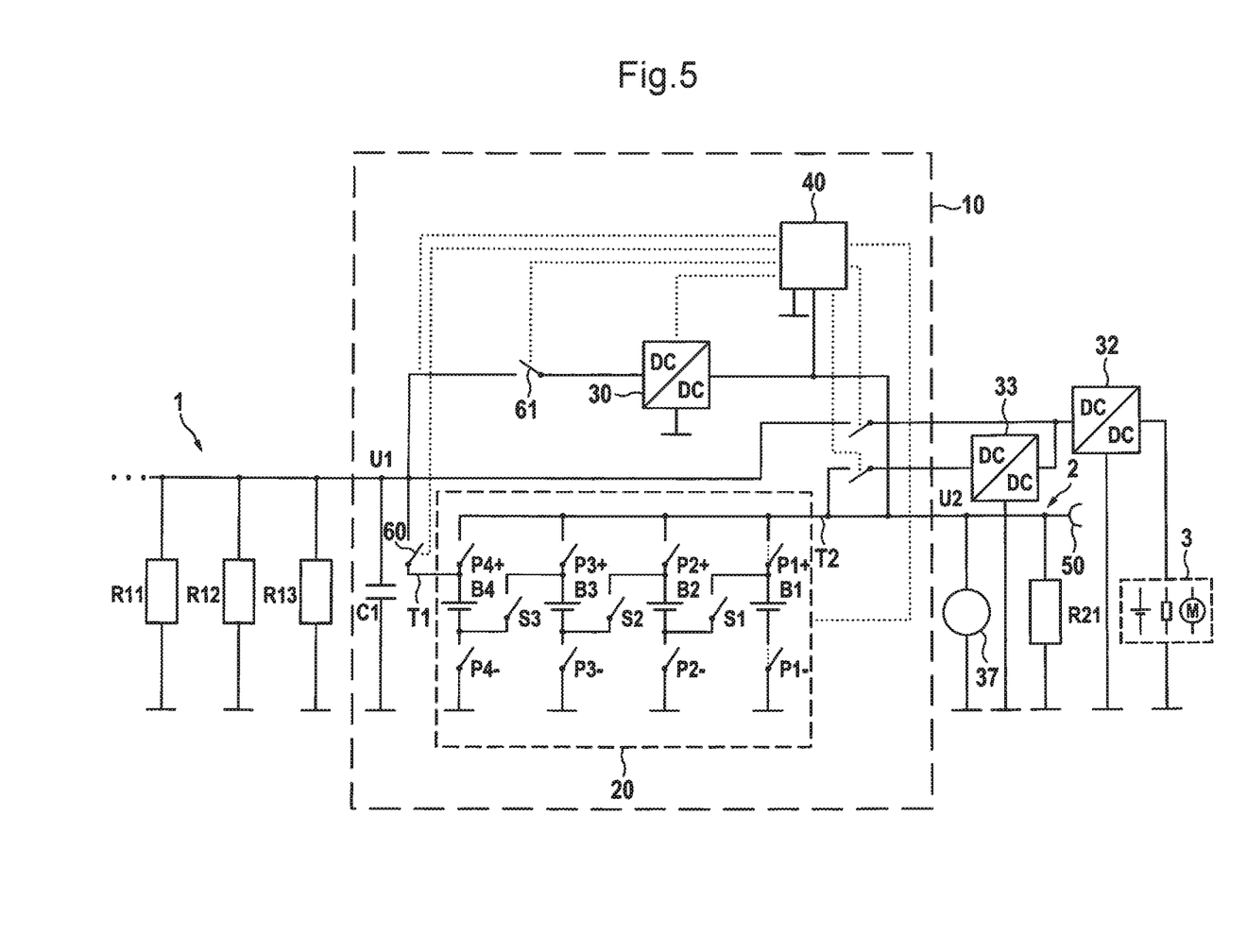
FIG. 5 shows a fourth example of the invention.

The example of FIG. 5 is a modification of the example of FIG. 4. Again the example has three circuits 1, 2, 3 operating at different voltages as explained above. The third circuit 3 supplies a second DC/DC converter 32 which provides an output voltage being adapted to the first circuit 1. The second DC/DC converter's 32 output is thus connected to the first circuit 1, e.g. to the connection tap T1 of the first circuit 1. Further, the second DC/DC converter 32 supplies a third DC/DC converter 33. In other words, the output of the second DC/DC converter 32 is connected to the input of the third DC/DC converter 33. The output of the third DC/DC converter 33 supplies the second circuit 2. For example, it can be connected to the connection tap T2. This chain of DC/DC converters appears at first glance to be more complicated than the solution of FIG. 4, but it is cheaper, as the third DC/DC converter 33 can be dimensioned much smaller than the second DC/DC converter 32. Beyond, there is no need to adapt the output voltage of the second DC/DC converter 32 to the position of switch 70. The second and the third DC/DC converter 32, 33 are each selectively coupled to the respective circuits 1, 2 by optional switches being operated by the controller 40. In FIG. 4 and FIG. 5 the first DC/DC converter 30 and the storage capacitor C1 are optional. Beyond, the description of FIG. 4 can be read on FIG. 5 as well.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A dual voltage power supply comprising at least one battery with multiple battery modules, comprising
    a first set of switches for connecting the battery modules in series to thereby provide a first voltage to a first circuit, when the first set of switches are closed, and to disconnect the series connection when the first set of switches are open;
    at least one connection tap being connected to a first battery module of the multiple battery modules to provide its voltage to a second circuit operating at a lower voltage than the first circuit, the first battery module being connected in parallel by a second set of switches to other battery modules of the multiple battery modules, the other battery modules being connected in parallel to each other and to the first battery module, when the second set of switches is closed and are not connected in parallel in when the second set of switches is open, wherein at least one of the multiple battery modules supplies at least one first DC/DC converter;

wherein the first DC/DC converter has an output connectable to the first circuit for supplying the first circuit, wherein at least one capacitor is connected in parallel to the output of the first DC/DC converter, wherein a controller controls the first set of switches and the second set of switches to either connect at least some of the battery modules in series or in parallel, and wherein the controller is configured to monitor the voltage at the capacitor and configured to close the first set of switches and open the second set of switches in case the voltage at the capacitor drops below a predefined value and vice versa.

2. The dual voltage power supply of claim 1, further comprising a first switch for disconnecting the first DC/DC converter from the first circuit and/or a second switch for disconnecting an input of the first DC/DC converter from the second circuit.

3. The dual voltage power supply of claim 1, wherein at least the first circuit is connected to an output side of at least one second DC/DC converter, said second DC/DC converter having an input side being connected to a third circuit with a third voltage level above the lower voltage.

4. The dual voltage power supply of claim 3, wherein the second DC/DC converter's output side is connected to an input side of a third DC/DC converter having an output side being connected to the second circuit.

5. A method for operating the dual voltage power supply of claim 1, the method comprising:
monitoring the power demand of the first circuit;
supplying, when the power demand is below a power threshold, the lower voltage to the second circuit by connecting the second circuit to at least one of the battery modules, and supplying the first circuit with the first DC/DC converter; and
connecting, when the power demand of the first circuit exceeds the power threshold, the battery modules in series by closing the first set of switches and opening the second set of switches, and connecting the first circuit to the battery modules.

6. The method of claim 5, further comprising connecting one of the battery modules to the second circuit when the power demand of the first circuit exceeds the power threshold.

7. The method of claim 5, wherein the first DC/DC converter is disconnected from at least one of the first and second circuits when the first set of switches are closed.

8. The method of claim 5, wherein a generator is powered by an engine and an output voltage of the generator is monitored, and, when the generator's output voltage is above a threshold, the generator's output is connected to the first circuit and the first set of switches is closed, or, when the generator's output voltage is below or equal to the threshold, the generator's output is connected to the second circuit and the first set of switches is opened and at least one of the battery modules is connected to the second circuit.

9. The dual voltage power supply of claim 1, wherein the first set of switches and the second set of switches each comprise a plurality of switches.

10. The dual voltage power supply of claim 9, wherein the controller is configured to close all or only some of the plurality of switches in the second set of switches.

11. The dual voltage supply of claim 1, wherein the first circuit operates at voltage higher than a voltage at which the second circuit operates.

12. The dual voltage supply of claim 1, wherein a capacity of the capacitor is selected to enable energizing the first circuit for a period longer than a required switching period.

13. A dual voltage power supply comprising at least one battery with multiple battery modules, comprising
a first set of switches for connecting the battery modules in series to thereby provide a first voltage to a first circuit, when the first set of switches are closed, and to disconnect the series connection when the first set of switches are open;
at least one connection tap being connected to a first battery module of the multiple battery modules to provide its voltage to a second circuit operating at a lower voltage than the first circuit, the first battery module being connected in parallel by a second set of switches to other battery modules of the multiple battery modules, the other battery modules being connected in parallel to each other and to the first battery module, when the second set of switches is closed and are not connected in parallel in when the second set of switches is open,
wherein at least one of the multiple battery modules supplies at least one first DC/DC converter,
wherein the first DC/DC converter has an output connectable to the first circuit for supplying the first circuit,
wherein at least one capacitor is connected in parallel to the output of the first DC/DC converter,
wherein a controller controls the first set of switches and the second set of switches to either connect at least some of the battery modules in series or in parallel,
wherein a changeover switch selectively connects a generator either with one of the battery modules and the second circuit or with the first circuit,
wherein the controller determines a voltage supplied by the generator, and
wherein:
when the voltage supplied by the generator is above a predetermined voltage the controller closes the first set of switches, opens the second set of switches, and connects the generator to the first circuit by corresponding activation of said changeover switch, or
when the voltage supplied by the generator is below the predetermined voltage the controller connects the generator to the second circuit by corresponding activation of said changeover switch.

14. The dual voltage power supply of claim 13, wherein the generator is connected to a second connection tab for supplying a voltage to the second circuit and for charging at least one of the battery modules.

15. A dual voltage power supply comprising at least one battery with multiple battery modules, comprising
a first set of switches for connecting the battery modules in series to thereby provide a first voltage to a first circuit, when the first set of switches are closed, and to disconnect the series connection when the first set of switches are open;
at least one connection tap being connected to a first battery module of the multiple battery modules to provide its voltage to a second circuit operating at a lower voltage than the first circuit, the first battery module being connected in parallel by a second set of switches to other battery modules of the multiple battery modules, the other battery modules being connected in parallel to each other and to the first battery module, when the second set of switches is closed and are not connected in parallel in when the second set of switches is open, wherein at least one of the multiple battery modules supplies at least one first DC/DC converter, wherein the first DC/DC converter has an output connectable to the first circuit for supplying the first circuit, wherein at least one capacitor is connected in parallel to the output of the first DC/DC converter, wherein a controller controls the first set of switches and the second set of switches to either connect at least some of the battery modules in series or in parallel, wherein a changeover switch selectively connects a generator either with one of the battery modules and the second circuit or with the first circuit, and wherein the controller determines a power consumption of the first circuit, and, in case the power consumption of the first circuit is above a power consumption threshold, the controller activates the changeover switch to connect the generator with the first circuit.

16. A dual voltage power supply comprising at least one battery with multiple battery modules, comprising a first set of switches for connecting the battery modules in series to thereby provide a first voltage to a first circuit, when the first set of switches are closed, and to disconnect the series connection when the first set of switches are open;

at least one connection tap being connected to a first battery module of the multiple battery modules to provide its voltage to a second circuit operating at a lower voltage than the first circuit, the first battery module being connected in parallel by a second set of switches to other battery modules of the multiple battery modules, the other battery modules being connected in parallel to each other and to the first battery module, when the second set of switches is closed and are not connected in parallel in when the second set of switches is open, wherein at least one of the multiple battery modules supplies at least one first DC/DC converter, wherein the first DC/DC converter has an output connectable to the first circuit for supplying the first circuit, wherein at least one capacitor is connected in parallel to the output of the first DC/DC converter, wherein a controller controls the first set of switches and the second set of switches to either connect at least some of the battery modules in series or in parallel, wherein at least the first circuit is connected to an output side of at least one second DC/DC converter, said second DC/DC converter having an input side being connected to a third circuit with a third voltage level above the lower voltage, wherein the output side of the second DC/DC converter is selectively connected via at least one switch being operated by the controller to the first circuit or to the second circuit, and wherein the output voltage of the second DC/DC converter is adjusted to the first voltage when the second DC/DC converter is connected to the first circuit and to the lower voltage when the second DC/DC converter is connected to the second circuit.

* * * * *